UNITED STATES PATENT OFFICE.

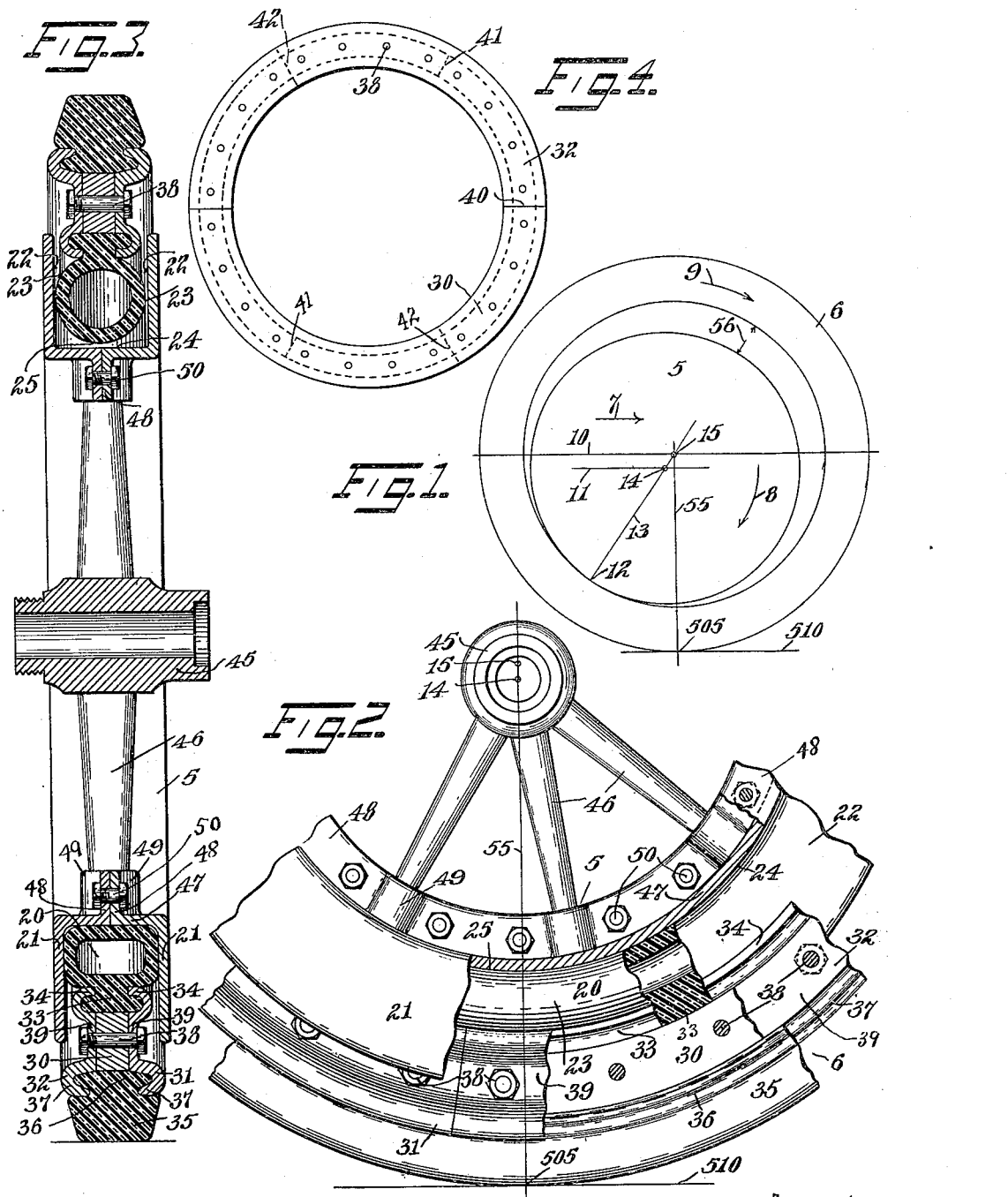

EDWIN STANCLIFF, OF NEW YORK, N. Y.

VEHICLE-WHEEL.

1,136,377.  Specification of Letters Patent.  Patented Apr. 20, 1915.

Application filed June 29, 1908, Serial No. 440,835. Renewed February 6, 1915. Serial No. 6,641.

*To all whom it may concern:*

Be it known that I, EDWIN STANCLIFF, a citizen of the United States, residing in New York city, in the county of New York and State of New York, have invented certain new and useful Improvements in Vehicle-Wheels, of which the following is a specification.

This invention relates to vehicle wheels, and is especially adapted for use in driving wheels for automobiles and other vehicles, and has particular reference to that class of wheel known as an eccentric or off-center wheel.

The improvements embodied in this invention are particularly applicable to that class of vehicle wheels wherein a center or inner wheel runs within an outer wheel with sufficient clearance to place the axis of the inner wheel in eccentric relation to the outer wheel.

Hereinafter in this specification for convenience the inner wheel, owing to the circumstance that it is illustrated as a driving wheel for the outer wheel, will be called the drive wheel, and outer wheel, since it affords a track surface for the inner or drive wheel, will be called the track wheel; when occasion arises to refer to the entire structure it will be called the wheel.

This improvement has for one of its objects that which is mentioned in United States Letters Patent No. 892,323 granted to me on June 30, 1908, for wheels, namely, to provide a wheel of this class for automobiles in which the drive wheel shall have such relation to the track wheel that there will be a load-regulated gripping action between the two wheels, the normal off-center relation of the two being so modified and controlled that instead of the axis of the drive wheel tending to run forwardly of the axis of the track wheel said drive wheel axis will normally tend to take a position backward of the axis of the track wheel.

In the drawings accompanying and forming a part of this specification Figure 1 is a diagram or chart representing the mode of operation of my improved wheel. Fig. 2 is a broken away portion of the wheel showing the various parts of which it is made up. Fig. 3 is a section of the wheel shown in Fig. 2. In this figure, however, the entire diameter is shown, whereas in Fig. 2 a segment only of the wheel is illustrated; and Fig. 4 is an illustration partly diagrammatic, showing the manner in which the joints are broken in placing together portions of the frame member of the outer wheel. The wheel, in the form herein illustrated, is represented of a character particularly intended for automobile uses; it will, however, be apparent that the improvements may be used for other purposes, and that the details of construction and proportions of parts may be modified to suit various conditions and requirements.

Fig. 1 shows a diagram, as it were, for illustrating the eccentric or off-center relation between the inner or "drive" wheel 5 and the outer or "track" wheel 6. The wheel is assumed to be running from left to right, that is, in the direction indicated by the arrow 7, consequently the drive wheel will be running in the direction of the arrow 8 and the track wheel in the direction of the arrow 9. The horizontal line 10 intersects the axis of the track wheel and the horizontal line 11 intersects the axis of the drive wheel. The point of contact between the outer circumference or track face of the drive wheel and the inner circumference or track face of the track wheel is represented at the point 12. The radius line 13 runs from such point through the axes 14 and 15 of the drive wheel and track wheel respectively. For a more complete understanding of the phenomena involved in the action of this class of wheel and its advantages reference is to be had to my said United States Letters Patent.

In my referred to Letters Patent the inner circumference of the track wheel affords a track face upon which an elastic tire carried by the outer circumference of the drive wheel will run. Flanges are carried by the outer wheel for engaging the side faces of the said tire. This construction and arrangement of the several elements operates for producing a frictional impingement or engagement in the nature of a driving adhesion or gripping action between the said tire and the inner faces or walls of the flanges tending to carry the track wheel around with the drive wheel, especially when the drive wheel is forcibly turned on its axis, and thus tends to carry the track wheel axis forwardly or in advance of the drive wheel axis. In practice the load will normally cause the point of engagement or bearing point of the drive wheel to pass along the inner surface of the track wheel, and normally keep near the lower portion of the wheel. In this present invention, which is an improvement upon that shown in my other said patent, the inner elastic tire 20 is carried by the track wheel 6 and the flanges 21, having faces 22 for the engagement of the side faces 23 of said inner tire 20, are carried by the drive wheel 5. The drive wheel 5 has a track face 24 for receiving the tread or track face 25 of the inner tire. The same general phenomena will be exhibited in this wheel, modified somewhat, of course, by the different relationship of the parts, but similar in kind, as in that described in the said Letters Patent.

The track wheel in the present instance is made up of a ring 30 which will have enough resiliency to absorb some of the shocks or jars to which a wheel is subjected when in use.

Bolted upon the respective sides of the ring 30 are rings 31—32 respectively. The inner tire 20 has a fastening portion 33 which will be engaged by inwardly turned portions or flanges 34 of the rings 31 and 32. A suitable cushion road tire 35 will be applied to the outer circumference of the track wheel and this will have a fastening portion 36 which will be engaged by inturned portions or flanges 37 of the rings 31—32.

The entire structure of the track wheel embodying the two tires and the framework, which in the present illustration embodies the three rings referred to, will be fastened together by suitable means, as for instance bolts 38, which are shown passing through the ring 30 and through the web portions 39 of the rings 31—32. The rings 31 and 32 bind together the two elastic tires 20 and 35. Each of the rings acts upon the tires after the analogy of a lever of the third order. The power is the bolt 38. For holding the tire 35 the work is at 37 and the fulcrum is at 34. For holding the tire 20 the work is at 34 and the fulcrum at 37. The tires are each elastic. The fulcrum support for the lever in each of its aspects is the same material as is that to which the work of the lever is directed. A balanced resistance upon the two tires results from this construction.

In Fig. 4 a simple means of construction has been illustrated wherein each of the rings 30, 31 and 32 will be made up in two halves. The lines 40 indicate the juncture between the ends of the rings 32, the dotted lines 41 indicate the juncture between the ends of the halves of the ring 30, and the dotted lines 42 indicate the junctures between the ends of the halves of the ring 31. It will thus be seen that the structure can be readily assembled and disassembled without assembling and disassembling the structure of the drive wheel. This will also cheapen the cost of construction. By breaking the joints in the manner illustrated a very strong structure will be produced.

The drive wheel is shown as embodying a hub 45 which will be of some suitable construction, the hub is shown as having spokes 46 which may be wooden spokes. Each of the flanges 21—21 is shown carried by a base portion 47 upon which the track face 24 above alluded to will be disposed, and from which base portions inwardly project flanges 48 which will have suitable sockets 49 for the reception of the ends of the spokes 46. Each of these members embodying the flanges 48 and 21 and base portion 47, together with the sockets 49, may be pressed up from sheet steel in an economical and substantial manner. The flanges 48 will be held together and the sockets 49 clamped upon the ends of the spokes by means of suitable bolts 50. The drive wheel and the track wheel may be disassembled one from the other by removing these bolts 50 and taking off one or both of the plates carrying the flanges 21, which will permit the removal of the outer wheel in its entirety.

By reference to Fig. 3 it will be seen that the inner tire 20 is compressed at the lower portion of the wheel where this supports the load which is put upon the wheel, and thus a close engagement not only between the track faces 24 and 25, but also between the side faces 23 of the tire and faces 22 of the flanges will be had; and that at the upper portion of the figure and of the wheel these faces are represented as out of engagement. The space between the faces 24 and 25 in the upper part of the illustration in Fig. 3 illustrate the amount of clearance or eccentricity between the wheels.

In Fig. 1 a much larger amount of eccentricity is exhibited at 56, but as was before stated Fig. 1 is in the nature of a diagram. Fig. 1 illustrates the position of the track wheel and drive wheel when the wheels are under load and in motion, and illustrates the axis 14 of the drive wheel normally behind the axis 15 of the track wheel, as witness its distance behind the vertical line 55 which is drawn from the axis 15 of the track wheel to the point 505 which is the center of the region of contact of the track wheel with the road surface 510.

In Fig. 2 the axes 15 and 14 are shown in alinement upon the vertical line 505, and this will be at the rest position of the wheel.

Having described my invention I claim:

The combination of an inner and outer wheel, said inner wheel comprising a pair of outwardly-directed spaced-apart flanges forming a grip-tire space opening toward the outer wheel, and an elastic grip-tire carried by the outer wheel and lying between said flanges to engage the track face therebetween, the tire being of such dimensions that it will expand and engage the flanges with a driving-grip variable according to the variations in the load.

EDWIN STANCLIFF.

Witnesses:
CHAS. LYON RUSSELL,
FRED. J. DOLE.

Copies of this patent may be obtained for five cents each, by addressing the "Commissioner of Patents, Washington, D. C."